United States Patent
Noda

[11] Patent Number: 5,818,644
[45] Date of Patent: Oct. 6, 1998

[54] GRADIENT INDEX OPTICAL ELEMENT AND METHOD FOR MAKING THE SAME

[75] Inventor: Satoshi Noda, Hachioji, Japan

[73] Assignee: Olympus Optical Co., Ltd., Tokyo, Japan

[21] Appl. No.: 743,156

[22] Filed: Nov. 4, 1996

[30] Foreign Application Priority Data

Nov. 2, 1995 [JP] Japan ................................ 7-285686

[51] Int. Cl.$^6$ ........................................ G02B 3/00
[52] U.S. Cl. ............................. 359/642; 359/642
[58] Field of Search ................... 359/642, 654, 359/435, 885; 430/945, 964, 495, 944; 385/18, 123, 115, 116, 131, 132, 147, 114, 124; 521/12, 54, 55; 264/64, 65, 66

[56] References Cited

U.S. PATENT DOCUMENTS

| | | | |
|---|---|---|---|
| 4,025,157 | 5/1977 | Martin | 350/96 |
| 4,108,622 | 8/1978 | Martin | 65/30 |
| 4,816,386 | 3/1989 | Gotoh et al. | 430/495 |
| 4,867,544 | 9/1989 | Bornstein et al. | 350/413 |
| 5,076,980 | 12/1991 | Nogues et al. | 264/65 |
| 5,177,605 | 1/1993 | Takahashi et al. | 358/98 |
| 5,182,236 | 1/1993 | Caldwell et al. | 521/12 |
| 5,349,473 | 9/1994 | Kurasawa et al. | 359/654 |
| 5,457,576 | 10/1995 | Atkinson et al. | 359/654 |
| 5,596,671 | 1/1997 | Rockwell, III | 385/147 |
| 5,617,252 | 4/1997 | Manhart et al. | 359/653 |

FOREIGN PATENT DOCUMENTS

| | | |
|---|---|---|
| 57-11845 | 1/1982 | Japan . |
| 62-128943 | 6/1987 | Japan . |
| 62-148329 | 7/1987 | Japan . |
| 62-216930 | 9/1987 | Japan . |
| 3-28133 | 2/1991 | Japan . |
| 3-141302 | 6/1991 | Japan . |
| 4-214043 | 8/1992 | Japan . |
| 5-88003 | 4/1993 | Japan . |

*Primary Examiner*—Frank G. Font
*Assistant Examiner*—Michael P. Stafira
*Attorney, Agent, or Firm*—Cushman Darby & Cushman IP Group of Pillsbury Madison & Sutro LLP

[57] ABSTRACT

A gradient index optical element comprises a component capable of absorbing light unnecessary for image formation and observation. The optical element is made according to a solgel process wherein a gradient index glass or plastic body is initially made and then incorporated with a light-absorbing component such as CuO and FeO that absorbs unnecessary light. The optical element has a filter function for eliminating light unnecessary for image formation and observation. A lens system having a reduced number of optical elements is realized.

13 Claims, 1 Drawing Sheet

GRADIENT INDEX OPTICAL ELEMENT AND METHOD FOR MAKING THE SAME

BACKGROUND OF THE INVENTION

1. Field of the Invention

This invention relates to a distributed or gradient index optical element capable of reducing the number of optical elements as being provided with light absorbing power and also to a method for making such an element as mentioned above.

2. Description of the Related Art

A lens system with which an image is formed on electronic image sensors such as CCD image sensors, typical of which are TV cameras, video cameras and still video cameras, usually has an infrared cutoff filter placed in front of the image sensor. This is because the image sensor has sensitivity to light in a wide range of wavelength including from a UV region to a near IR region, and thus the region of the sensitivity greatly differs from the luminous efficiency of men, so that correction is essential in practical applications. Since optical glasses used for lenses absorb light in the UV region without permitting the transmission thereof, no specific measure is necessary in regard to for the light in the wavelength of the UV region in most cases. However, optical glasses exhibit an adequate transmittance of light in the near infrared region, making it necessary to take a specific measures therefor.

Usual practice is, as having set out above, to place an IR ray cutoff filter in front of an image sensor. By this, the near infrared light passing through a lens system is absorbed with the filter, thereby preventing the light from reaching the lens system. More particularly, the cutoff filter is frequently used by bonding with a low pass filter provided before the image sensor. The bonding of these filters is for the following reasons. If the respective filters are placed separately in position, much more space becomes necessary and a mirror frame structure becomes complicated, coupled with further problems that the increasing number of filter faces results in an increasing reflection loss of light and also brings about a problem of flare as will be caused by multiple reflection.

The IR ray cutoff filter is provided not only for the correction of the luminous efficiency as set out above, but also for another purpose. For instance, with endoscopes, a YAG laser (approximately 1060 nm) or a semiconductor laser (approximately 800 to 900 nm) having a near infrared lasing wavelength is used to conduct the resection operation of the internal organ under the endoscope, whereupon it has sometimes been experienced that the laser beam that irradiated the affected part in turn reflected from around the affected part and passed toward the object lens of the endoscope. This is inconvenient since the electronic image sensor has adequate sensitivity in this wavelength region. Especially, a substantial quantity of light is transmitted in order to burn the tissue off, so that it is necessary to cut off the reflected laser beam satisfactorily. Needless to say, it is also necessary not to permit other light rays in the near infrared region to pass to an electronic image sensor by any reason or via any path.

With laser surgical knives that have high-beam intensity, there may arise the problem that if the beam is directly visually observed, for example, and is transmitted to the eyes of an observer, not to mention transmission to electronic image sensors, the retinas will be damaged. Accordingly, the beam has to be cut off in the inside of the optical system for observation.

Currently employed infrared cutoff filters are frequently made of phosphate glass doped with CuO. In general, the phosphate glass is not good in regard to chemical durability. When such a filter is employed or kept or transported under condition of high temperature and high humidity, it has been inconveniently experienced that a defect like yellowing is formed on the surfaces of the filter, thereby making a cloudy surface. To avoid this, there has been proposed a structure wherein when bonded with a low pass filter as set out hereinbefore, the IR ray cutoff filter is bonded by sandwiching between the low pass filters so that the cutoff filter is substantially free of contact with air. As proposed in Japanese Unexamined Patent Publication Nos. Sho 62-128943 (1987) and Hei 4-214043 (1992), efforts have been made to improve the chemical durability of the phosphate glass even slightly by doping aluminum or fluorine in the glass composition. However, satisfactory characteristic properties have not been necessarily obtained.

The prior art techniques have been stated above with respect to the removal of light in the near infrared region in optical systems including electronic image sensors such as CCD image sensors. Aside from the optical systems, there may be cases where it is desirable to cut off light with a specific wavelength or where the relative intensity of light rays having different wavelengths is altered, e.g. the case where the spectral transmittance of optical instruments is set depending on the photosensitive characteristics of a film or a plate, the case where the function of correcting a color temperature is imparted in conformity with the spectra of a light source, and the case where a heat ray (infrared ray) generated from a light source is intercepted. Alternatively, if a light source is considerably bright or where no stop can be used for some reasons of image pickup or in view of the limitation on optical systems, it becomes necessary to remove an excess quantity of light, which exceeds a range used for image formation or observation, over a whole wavelength range.

The IR ray cutoff filter of the type set out above is usually fabricated according to a melting process. On the other hand, attention has now been drawn to a solgel process which is one of the methods of fabricating a new functional glass called "new glass." In fact, methods for making IR ray cutoff glass or colored glass containing a cutoff glass composition have been developed using the solgel process. For instance, Japanese Examined Patent Publication No. Sho 60-3013 (1985), and Japanese Unexamined Patent Publication Nos. Sho 62-148329 (1987) and Hei 3-28133 (1991) set out methods wherein colored components are preliminarily incorporated in sols. Japanese Unexamined Patent Publication No. Sho 62-216930 (1987) sets forth a method wherein colored ionic components are impregnated in sols.

At present, lens systems are now making considerable progress with respect to their lightweight, small thickness and miniaturization. This facilitates positive use of novel types of optical elements which have never been employed in prior art counterparts. One of such optical elements includes an aspherical lens. Because the aspherical lens has a great freedom in the control of light, it greatly contributes to the lightweight, small thickness and miniaturization of the lens and has been utilized in various fields including those fields of domestic articles. However, it has been theoretically confirmed that the aspheric lens has little effect on the correction of chromatic aberration and the curvature of field, thus placing limitation on the latent ability of the lens.

Under these circumstances, attention is now being paid to a distributed index lens or gradient index lens (hereinafter referred to simply as GRIN lens) as a novel type of optical element which is useful for further progress in regard to the lightweight, small thickness and miniaturization of a lens system or for further improvement in performance while keeping its miniaturization. The GRIN lens is able to correct chromatic aberration and the curvature of field, not to mention the correction of aberrations made by the aspheric lens. In this sense, great attention has been drawn to the GRIN lens as an "optical element of next generation" which is essentially required for permitting the lens to be miniaturized to the very limit.

The lens system using GRIN lenses is able to reduce the number of lenses to about ½ to ¼ of the lens systems consisting of known homogeneous spherical lenses. When the number of lenses is reduced to the limit in this manner, the number of optical elements other than lenses, e.g. filters including an IR ray cutoff filter, adds a great weight to the lens system. The existence of the filters offers obstacles in the further miniaturization and the cost reduction of the lens system.

In general, spherical and/or aspherical lenses are made by polishing or molding. We have already developed a technique wherein a glass for an IR ray cutoff filer is used in place of an optical glass to make a lens, which serves both as a lens and as an IR ray cutoff filer. From the viewpoint of the number of lenses, this lens contributes to abolishing an IR ray cutoff filter. Nevertheless, the optical constant of the IR ray cutoff filter cannot be optionally selected. This is disadvantageous from the standpoint that the lens cannot be flexibly designed. In addition, another disadvantage arises in that lenses, whether convex or concave, are not uniform in thickness, so that the IR ray cutoff effect varies depending on the height of the ray being passed. In order to make the variation as small as possible, it will be inevitable to place a limitation on the shape of a lens serving as an IR ray cutoff filter so that the lens is so shaped as to suffer little influence of the ray height. The shape which ensures little influence of the ray height leads to the formation of an approximately concentric meniscus lens or of a convex or concave lens having a great radius of curvature, thus being limited to lenses whose power is not great. The weak power of the lenses establishes a great obstacle on miniaturization. With respect to other types of filters, it is necessary to place some limitation on the shape thereof in order to permit compatibility with filter characteristics as required, so that such filters do not, in most cases, contribute to the miniaturization of optical systems.

SUMMARY OF THE INVENTION

It is accordingly an object of the invention to provide a distributed or gradient index optical element which enables one to reduce the number of optical elements constituting a lens system over that of known GRIN Lenses.

It is another object of the invention to provide a method for making such an optical element as mentioned above.

According to one aspect of the invention, there is provided a gradient index optical element which comprises a component capable of intensely absorbing light in wavelength ranges other than those used for image formation and observation.

According to another aspect of the invention, there is also provided a method for making a gradient index optical element according to a solgel process which preparing a sol containing a material capable of forming at least one component selected from the group consisting of CuO, FeO, CoO and $VO_2$ in a sintered glass body, and gelling the sol.

DESCRIPTION OF THE INVENTION

Figure 1:
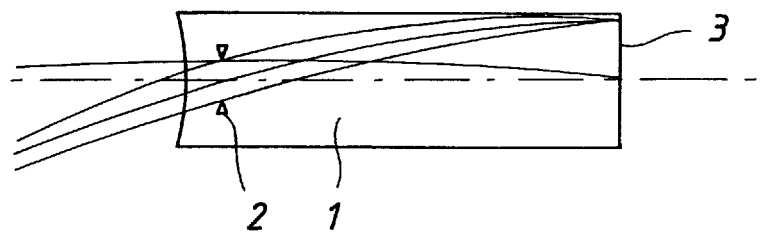
FIG. 1 is a front view showing the measurement of a GRIN lens in Example 1.

The gradient index optical element of the invention is provided with a filter effect in the inside thereof and comprises a component capable of intensely absorbing light rays in a range other than those used for image formation and observation. When the component consists of a component capable of absorbing a near infrared ray, the resultant optical element exhibits the filter action with which an IR ray can be cut off.

The component capable of absorbing a near infrared ray is at least one member selected from oxides such as CuO, FeO, CoO and $VO_2$, and a matrix therefor should consist of glass.

Another type of component capable of absorbing a near infrared ray consists of at least one member selected from anthraquinones, phthalocyanine compounds, naphthalocyanine compounds, chromium metal complex salts, cobalt complex salts, polycondensates of tungsten hexachloride and tin chloride, diothyl metal complexes, squalilium compounds, oxidizer-doped acetylene polymers, mixtures of thiourea and copper sulfide, imonium materials and $Cu^{2+}$, and a matrix therefor should consist of a plastic resin.

In the practice of the invention, the near IR ray-absorbing component may be distributed in a radial direction with respect to the concentration thereof irrespective of the glass and plastic resin matrices. In this case, the concentration distribution of the near IR ray-absorbing component along the radial direction is in such a relation that the thickness of a lens and the concentration of the component are contrary to each other. Little problem arises even if the near infrared ray absoptivities at given positions along the radial direction of the lens are approximately constant.

The gradient index optical element of the invention contains a component capable of absorbing light rays in ranges other than those rays used for image formation and observation. When light rays are passed through the optical element system while being subjected to refraction or turning inside the gradient index optical element, rays which are unnecessary or harmful for image formation and observation are absorbed inside the gradient index optical element, thus preventing such rays from finally taking part in an image being formed.

The light rays unnecessary or harmful for image formation and observation may have a given wavelength or may be included within a wide range or ranges of wavelength. More particularly, it may be desirable to remove a light ray with a given wavelength or to change a relative light intensity between light rays having different wavelengths in cases including the case where a spectral transmittance of an optical instrument is set depending on the photosensitive characteristic of a film, a plate or an electronic image sensor such as CCD, the case where the function of correcting a color temperature is imparted in conformity with a spectrum from a light source, the case where a heat source (infrared ray) generated from a light source is intercepted, and the like. Alternatively, where a light source is considerably bright or where no stop can be used for some reasons of image pickup or in view of the limitation on optical systems, it becomes necessary to remove an excess quantity of light over a whole wavelength range.

As will be apparent from the above, the light rays in a range other than those rays used for image formation and observation do not mean only light rays in ranges outside the wavelength range used for image formation and observation. More particularly, such light rays generically mean light components unnecessary for image formation and observation, including a light component which is within a wavelength range used for image formation and observation but corresponds to an additional quantity of light exceeding a quantity of light necessary for the observation and some wavelength components which are not required for arranging a spectral distribution characteristic in a desired shape.

In the practice of the invention, an additive component capable of absorbing near IR rays is contained in the gradient index optical element, so that the near IR rays can be absorbed and removed. Accordingly, when the gradient index optical element is applied as a lens system for forming an image on an electronic image sensor such as a CCD, near IR rays can be cut off before reaching at the electronic image sensor. Thus, an IR-ray-free image can be formed on the image sensor without use of any IR ray cutoff filter.

With a lens system comprising a combination of plural lenses, it may be possible that a plurality of lenses (or GRIN lenses) are properly used to cut infrared rays therewith. However, if the lens system is made of a single lens consisting of a GRIN lens, it becomes necessary to incorporate a component capable of absorbing an IR ray in amounts sufficient to show a good infrared cutoff effect only with one GRIN lens.

In general, the GRIN lens frequently becomes great in thickness from the standpoint of optical design. This is simply for the following reasons: because limitation is placed on the refractive index, $\Delta n$, of a GRIN lens to be made to be, the GRIN medium is made long, so that light is caused to be more refracted or curved in the GRIN lens; and a light ray is gradually curved in the GRIN medium to suppress the occurrence of aberration to a low level. Assuming that an ordinary IR ray cutoff filter has, at most, a thickness of 1 to 2 mm, the GRIN lens having the IR ray cutoff effect allows near IR rays to be readily cut off with only one GRIN lens even if the concentration of a near IR ray-absorbing component in the glass matrix is low. This is advantageous in the fabrication of glass since it is sufficient to use a relatively small amount of the IR ray-absorbing component in the glass matrix.

The assembly of such a gradient index optical element, as having set out hereinabove, in an electron image inputting optical device is enabled by providing a GRIN lens comprising at least a component capable of absorbing a near IR ray and an electronic image sensor. If the optical effect of the GRIN lens is fully shown, it will be possible that a lens system can be made of only one GRIN lens. The GRIN lens has the IR ray cutoff capability. Thus, if an electronic image sensor is added, an optical system may be constituted along with the GRIN lens.

The optical device may be further provided, by a usual manner, with a low pass filter for the purpose of eliminating "moiré" which is formed owing to the well-ordered arrangement of a light accepting unit of the electronic image sensor. Of course, a complete image formation system which is operable without the provision of any low pass filter may result depending on the field of application. Optical devices which do not need any low pass filter include an endoscope for medical treatment which is used for a high frequency-free image. Whether or not a low pass filter is provided should be determined depending on the type of an image to be formed and the quality of a required image. Accordingly, such optical devices are not limited to an endoscope for medical treatment. The electronic image sensors used are not critical in type and all the types of image sensors may be used, irrespective of the imaging principles, provided that they are able to convert images into electric signals. Examples of such sensors include solid-state image sensors and pickup tubes such as CCD, CMD, SIT and AMI.

The composition used to develop an IR ray cutoff effect comprises at least one component selected, as oxides, from CuO, FeO, CoO and $VO_2$ present in a glass matrix. All the metals in the oxides consist of transition metals wherein it is utilized that $Cu^{2+}$, $Fe^{2-}$, $Co^{2+}$ and $V^{4+}$ exhibit absorptions in a near IR region owing to the transition of the d electron. This permits a variation in absorption capacity depending on the amount of the ions present in the glass. With the GRIN lens, the content is determined while taking into account the thickness of the GRIN lens used.

The glass component or matrix should preferably comprise, at least, $SiO_2$, CuO and at least one refractive index-controlling component. More preferably, $Al_2O_3$ should be added to the component. $SiO_2$, which is an essential component in the GRIN glass is a fundamental component establishing a glass skeleton. An IR ray cutoff filter is, in most cases, made of a skeletal component consisting of phosphoric anhydride ($P_2O_5$). The phosphoric anhydride has very poor chemical durability. On the other hand, $SiO_2$ has high chemical durability or resistance.

The essential component, CuO, is a component capable of absorbing a near IR ray. Among CuO, FeO, CoO and $VO_2$, CuO is the most suitable component for the absorption of a near IR ray.

The glass component should further comprise, as an essential component, at least one index-controlling component. For the formation of the GRIN lens, only one component is sufficient for imparting a index distribution characteristic to the glass at the minimum. Only one component is able to form a GRIN lens. In this connection, however, one index-controlling component may limit application of the resultant composition because the GRIN lens provides a high dispersion distribution characteristic, so that the lens with a salient distribution characteristic causes chromatic aberration to occur much more considerably than homogeneous lenses. With a reentrant distribution characteristic, the chromatic aberration occurring at the surface offsets the chromatic aberration produced in the medium, with the resultant lenses being applied to some fields. In order to make a more effective GRIN lens, at least two index-controlling components are added to the glass matrix to correct chromatic aberration in the medium. More particularly, it is preferred to make a GRIN lens having the chromatic aberration correcting ability called a low dispersion distribution or a negative dispersion distribution. In order to realize a GRIN lens having such characteristics as mentioned above, it is preferred that a plurality of di or multivalent components be distributed in different concentrations to provide a kind of composite distribution characteristic as disclosed in Japanese Unexamined Patent Publication Nos. Hei 3-141302 (1991) and Hei 5-88003 (1993). Especially, where only one GRIN lens is used to make an optical system of an electronic image sensor, it is essential that the GRIN lens have a dispersion characteristic called a low dispersion distribution or negative dispersion distribution.

It will be noted that the index distribution characteristic is represented by the following equation:

$$n_\lambda(r) = N_{0\lambda} + N_{1\lambda} \cdot r^2 + N_{2\lambda} \cdot r^4 + N_{3\lambda} \cdot r^6 + \ldots,$$

wherein r is a distance from an optical axis, $N_{i\lambda}$ is a coefficient of an index distribution at the wavelength of $\lambda$ and i is a natural number.

The Abbe number ($V_1$) of a medium showing the degree of chromatic aberration occurring in the medium of the gradient index optical element is represented by the following equation:

$$V_{1d}=N_{1d}/(N_{1F}-N_{1c}),$$

wherein $N_{1d}$, $N_{1F}$, and $N_{1c}$ are, respectively, secondary index distribution coefficients in the d line, F line and C line. The dispersion distribution characteristic of a GRIN medium in the case where the relation between $N_{1d}$ and the Abbe number $V_{0d}$ ($V_{0d}=(N_{0d}-1)/(N_{0F}-N_{0c})$) like ordinary $v_d$) is $0>V_{1d}$ is called a "negative dispersion distribution." In this case, a chromatic aberration in a direction opposite to that of the chromatic aberration occurring usually at the surface of a GRIN medium takes place. The dispersion distribution characteristic of the GRIN medium in the case where $V_{0d}>V_{1d}>0$ is called a "low dispersion distribution" wherein little chromatic aberration takes place but a chromatic aberration along the same direction as the chromatic aberration usually generated at the surface takes place slightly.

$Al_2O_3$ promotes glassification and can improve thermal and chemical durabilities of glass. The most important function is to stabilize, in the glass, CuO which is a component capable of absorbing a near IR ray. When CuO is reduced in glass, it converts to $Cu_2O$, with the tendency that a so-called "copper red glass" assuming a red color is formed. Thus, it is necessary to stabilize CuO in glass.

As other additive components, it is effective to add at least one alkali or alkaline earth metal component. This metal facilitates glassification and has the function of reducing a distribution in coefficient of thermal expansion of the GRIN glass caused by the addition of an index distribution controlling component. It may be effective to add the alkali metal or alkaline earth metal component as having a given concentration distribution in order to reduce or uniformize the distribution in coefficient of thermal expansion of the GRIN glass.

In the practice of the invention, a GRIN lens using a synthetic resin called plastic GRIN may be likewise used. For this purpose, a component capable of absorbing a near IR ray consists at least one member selected from anthraquinones, phthalocyanine compounds, naphthalocyanine compounds, chromium metal complex salts, cobalt complex salts, polycondensates of tungsten hexachloride and tin chloride, diothyl metal complexes, squalilium compounds, oxidizer-doped acetylene polymers, mixtures of thiourea and copper sulfide, imonium materials and $Cu^{2+}$. In this case, a matrix should consist of a plastic resin. Thus, the resultant GRIN lens is made of a synthetic resin called plastic GRIN. Although the mechanisms for the near IR ray cutoff capability differs depending on additive components, the absorptance varies depending on the amount of additive components in the plastic matrix, like the case using a transition metal. The content should be determined depending on the thickness of the GRIN lens.

In both glass GRIN lenses and plastic GRIN lenses, the amount of a near IR cutoff component which is added to the particular GRIN lens should be appropriately determined since the cutoff capability varies depending on the content. If the content is higher, a lower transmittance of light in a near IR region results. At the same time, absorption takes place in some visible light regions and the transmittance of "red" light in a visible light region also decreases along with the transmittance of light in the near IR region. As viewed through the eyes of men, glass is seen as being transparent blue in color. A higher content tends to make a deeper blue color. On the contrary, when the content is low, the above is reversed, i.e. the cutoff capability of light in a near IR region becomes lower, resulting in unsatisfactory correction of sensitivity of images obtained by an electronic image sensor.

The content of a near IR ray-absorbing component varies depending on how many lenses are used to constitute an IR ray cutoff GRIN lens. Moreover, an allowable range of the content also varies depending on the thickness of the GRIN lens. In general, the thickness of the GRIN lens tends to be smaller as the value of $\Delta n$ increases and to be greater at a smaller value of $\Delta n$. Strictly speaking, the thickness should be determined depending on the optical design for determining correction of the respective aberrations. Preferably, the amount of the near IR ray-absorbing component should be determined depending on the thickness of an optically designed lens.

As stated hereinabove, the near IR ray cutoff effect depends on the thickness of a lens if the lens is made of a conventional glass having a uniform composition. Likewise, where the GRIN lens is imparted with the near IR cutoff capability, the near IR cutoff capability does not develop uniformly on an electronic image sensor depending on the shape of the GRIN lens. For instance, where an imaging lens system is constituted of a single GRIN lens and particularly where a field angle is made to be great, there is the tendency that this lens is in a concave shape. In the case, the near IR-ray-absorbing component is distributed along the radial direction with respect to its concentration and is more concentrated around the center of the lens. By this, the non-uniformity of the IR ray cutoff effect along the thickness of the lens can be avoided.

If the GRIN lens is in the form of a concave shape, the lens thickness is made smaller toward the center of the lens, with the tendency that the IR ray cutoff capability becomes small. In this case, it is sufficient to increase the concentration of the near IR ray cutoff component. If the GRIN lens is in the form of a convex shape, the above is reversed. In a strict sense, it is preferred to check the manner of light passage in the lens by tracing a light ray according to a computer and determine the concentration distribution characteristic while taking into consideration an obliquely incident light ray such as an abaxial light ray. The light ray proceeds through the GRIN lens in a curved form, so that care should be taken to the fact that the optical path length is not always determined depending on an apparent thickness of the lens.

This concept is applicable not only to a gradient index optical element, but also a lens whose refractive index is uniform. In order to offset the dependency of the IR cutoff effect on the lens thickness which takes place when an IR cutoff filter is processed in the form of a lens, a given distribution in concentration of an IR ray-absorbing component is established in the IR ray cutoff filter while preliminarily assuming the shape of the lens. In doing so, when the filter is polished or molded in the form of a lens, it becomes possible that the IR ray cutoff effect is made constant on an electronic image sensor. Strictly speaking, however, if the given concentration distribution of a near IR ray-absorbing component is established in a glass matrix, it has been frequently experienced that the refractive index of the glass matrix varies by the addition of the component. Accordingly, in order to make a glass which has a uniform refractive index and wherein the near IR ray cutoff effect varies along the radial direction or along the thickness of the glass, it is necessary not only to simply provide the concentration distribution of a near IR-ray-absorbing component, but also to add another type of component such as an alkali component so that an index distribution which varies by the addition of the near IR-ray-absorbing component is offset. In this connection, however, when taking the effect of a gradient index optical element into consideration, it is often effective to optically, positively utilize the variation in the index distribution caused by the addition of a near IR ray-absorbing component without offsetting the index distribution.

The method of the invention for making a gradient index optical element according to a solgel process is characterized by preparing a sol containing a material capable of forming at least one component selected from CuO, FeO, CoO and $VO_2$ in a sintered glass body, and gelling the sol.

This method is concerned with the fabrication of a glass GRIN lens capable of cutting a near IR ray. The fundamental process is based on the technique of making a GRIN lens according to a solgel process. Where the chromatic aberration of a GRIN lens is taken into account at the time when an index distribution characteristic is imparted, it is preferred to use a di or multivalent component for imparting a desired concentration distribution. When using an "ion exchange method" wherein an index distribution characteristic is imparted after fabrication of glass according to a melting method, it is almost impossible to make a lens having good optical characteristics or to make a lens so that the aberrations of all single lenses are suppressed to be low. From the standpoint that GRIN lenses are made as having such optical characteristics as to reduce the number of lenses, a solgel process is selected as the most preferred method. Another reason for the selection of the solgel process is that it is very difficult to make a glass stably containing $Cu^{2+}$ according to a melting method. The solgel process is favorable for making a glass which is composed of $SiO_2$ as a main glass-forming oxide and such glass has high chemical durability as has been set out hereinbefore.

A fundamental process of making a GRIN lens according to the solgel process comprises preparing a liquid sol from a starting liquid material, charging the sol in a mold, and allowing the sol to stand for a given time to obtain a jelly-like gel. Subsequently, the gel is immersed in a liquid such as an acid or a metal salt solution so that an intended component has a desired concentration distribution in the gel. If necessary, the gel is further immersed in an appropriate solution so that the concentration distribution of the intended component is not disturbed. Thereafter, the gel is dried to obtain a porous dried gel and finally sintered to obtain a dense GRIN glass body.

A sol which contains a starting material capable of forming at least one component selected from CuO, FeO, CoO and $VO_2$ is prepared in the glass body after sintering and gelled. By this, a near IR-ray-absorbing component can be introduced into the glass body. The gel is treated to have a given index distribution, whereupon it may be simultaneously treated to provide a given concentration distribution. Alternatively, the concentration distribution may be formed by a separate process. Of course, it is possible to treat the gel to impart only an index distribution thereto without imparting any concentration distribution.

The concentration distribution may be imparted or not imparted by appropriately controlling the reactions in the respective processes or by selecting the type of starting material for an IR ray-absorbing component to be added to the sol, by which the chemical reaction is changed to provide a desired gel structure. More particularly, an alkoxide or chelate of a metal for a near IR-ray-absorbing component or a derivative thereof is provided as a starting material and subjected to a gelation reaction. During the reaction, the bonds with Si, serving as a skeletal component, through oxygen are formed, thereby obtaining a gel having the strong bonding relation of the metal with the gel. The near IR-ray-absorbing component in the thus obtained gel is not simply moved with water or organic solvents. Accordingly, when it is desired not to give a great concentration distribution or when GRIN glass bodies having the same index distribution are prepared while changing the degree of coloration, such a gel as obtained above is effective in making GRIN glass bodies without losing a balance in the diffusion of the near infrared-ray-absorbing component at the step of establishing an index distribution. Where it is required to distribute the concentration, a method using elution with an acid may be utilized. Moreover, when the gelation reaction is carried out using salts or complexes of metals for a near IR-ray-absorbing component as a starting material, the bonding relation of the skeletal component is not established, making it relatively easy to form a desired concentration distribution by means of water or organic solvents. Thus, this is effective when it is desired that a near IR-ray-absorbing component is dispersed in a desired concentration distribution. As a matter of course, it is possible to disperse the component uniformly or without any distribution of concentration when the type of solution is properly selected.

Another method of the invention for making a gradient index optical element also utilizes the solgel process and is characterized by the step of bringing a wet gel, a dried gel or a calcined gel in a sintered glass with a solution or a gas comprising a material of capable of forming at least one component selected from CuO, FeO, CoO and $VO_2$.

In the method wherein a GRIN glass is made according to a solgel process, a wet gel, dried gel or calcined gel is brought into contact with a solution or a gas containing a material capable of forming at least one near IR-ray-absorbing component in a sintered glass. The thus contacted absorbing component is added to the gel in a subsequent step. The manner of the contact generally includes immersion of the gel in the solution. Of course, the solution may be contacted in the form of mists, foams or droplets from a shower. The near IR-ray-absorbing component may be dispersed as imparting a concentration distribution characteristic by appropriately selecting the treating time, the concentration of the component, the treating temperature, the type of solvent and the after-treating conditions. Alternatively, the component may be dispersed uniformly. In addition, the concentration distribution may be controlled as having a given profile.

In the practice of the invention, the methods stated above may be used in combination. Moreover, a component which has once been introduced through a combination of a plurality of steps may be partially dissolved out.

In the latter method, a solution is used to introduce a near IR-ray-absorbing component into the gel. The solution used for the concentration distribution should have higher solubility of various types of metal salts than solutions used in other steps and are thus suitable for dissolving near IR-ray-absorbing components. Since the near IR-ray-absorbing component is introduced simultaneously with the dispersion in a given distribution of concentration, any additional step is not necessary, with the attendant advantage that a cost rise is suppressed. Moreover, when a near IR-ray-absorbing component is dissolved in a solution for establishing a distribution of concentration, the dispersion conditions for the formation of the distribution vary slightly. If this variation is positively utilized, the distribution profile can be appropriately controlled as desired, thus being effective in the control of the profile of the index distribution. The gel used in the method may be one in which a near IR-rayabsorbing component has been preliminarily incorporated or one having no absorbing component therein.

With the GRIN glass using a plastic matrix, usual practice is to prepare the glass through copolymerization. Various copolymerization procedures are known and are fundamentally applicable in any type. For instance, a GRIN glass is obtained according to a two-stage copolymerization process wherein a crosslinkable monomer $M_1$ capable of yielding a high refractive index polymer is partially polymerized to obtain a gel rod, followed by immersion in a monomer $M_2$ capable of yielding a low refractive index polymer (immersion process), or followed by exposure to an atmosphere of $M_2$ vapor (vapor phase process), thereby copolymerizing $M_1$-$M_2$ to obtain a GRIN glass. When a near IR-ray-absorbing component is contained in $M_1$ or $M_2$, it becomes possible to introduce the absorbing component into the copolymer. The concept of the dispersion with a concentration distribution in the GRIN lens is fundamentally similar to that of the glass GRIN lens.

In the practice of the invention, since the lens of the invention serves as a filter without the use of any separate filter, the resultant lens system can be miniaturized correspondingly to the absence of a filter. Especially, the overall length of the lens system can be shortened. Because the function of an IR-ray-cutoff filter which has been conventionally, inevitably located in front of an electronic image sensor is built in the lens system, the shortage of the overall length of the lens system can be realized without impeding the properties of the optical system. This is effective when such a system is applied, for example, to an optical device such as an endoscope, the tip portion of the endoscope is more likely to bend, resulting in more likelihood of an abdominal cavity to be observed and cured. Since reflection surfaces do not exist, there is no loss in the quantity of light at the surfaces of an IR-ray-cutoff filter or flare does not occur. Thus, clearer images can be obtained. Moreover, the number of parts is reduced, thus leading to the reduction of costs such as the cost of parts, the cost reduced by the reduced number of assembling steps and the like, and also to the reduction in failure rate. In the practice of the invention, since a silica glass is used as a matrix, the chemical durability is remarkably improved. Accordingly, the optical element can satisfactorily stand use against medical fluids from medical appliances or under high temperature and high pressure sterilization conditions.

The invention is described in more detail by way of examples.

EXAMPLE 1

25 ml of 0.01N hydrochloric acid was added to 50 ml of tetramethyl silicate and agitated for 1 hour, during which partial hydrolysis reaction was performed. Thereafter, a mixture of 98 ml of a 1.5 moles/liter of barium acetate aqueous solution and 40 ml of acetic acid was added to the reaction product. The mixture was agitated for a further 3 minutes and poured into a sealed, closed container made of tetrafluoroethylene (commercial name "Teflon®") and having a cylindrical hole of a high roundness having an inner diameter of 10 mm. The container was covered and sealed, followed by gelation at room temperature. The resultant gel was aged for 5 days, followed by immersion in a solution of 0.45 moles/liter of barium acetate in a mixed solvent of isopropyl alcohol (hereinafter referred to simply as IPA) and water at a mixing ratio of 6:4 at 60° C., removal of the acetic acid and aging of the gel. The gel was immersed in a mixture of methanol and ethanol at a mixing ratio of 7:3, ethanol, a mixture of ethanol and acetone at a mixing ratio of 5:5, and acetone in this order, by which fine crystals of the barium acetate were precipitated and fixed in fine pores in the gel.

The resultant homogeneous gel was immersed, for index distribution, in 150 ml of a methanol solution of 0.3 moles/liter of potassium acetate and 0.05 moles/liter of cupric acetate for 8.5 hours, followed by immersion in a mixture of ethanol and acetone at a mixing ratio of 5:5, acetone and acetone in this order. As a result, fine crystals of the barium acetate, potassium acetate and cupric acetate were precipitated and fixed in the fine pores of the gel.

The gel was dried in dry air at 60° C. for 10 days to obtain a dried gel. The thus obtained dried gel was sintered by heating to 750° C. in a tubular furnace in a stream of oxygen and helium, thereby obtaining a crack-free GRIN rod having a diameter of about 3.4 mm and a refractive index, An, of about 0.048. The sintered rod assumed a bluish transparent color as a whole. When the rod was subjected to measurement of spectral transmittance in a visible to IR ray region, the transmittance was low in the range of approximately from 800 nm to a long wavelength region (near IR region). However, the rod exhibited a high transmittance in a visible light region.

The index distribution of the bluish GRIN rod was measured. The measurements were used to design a single lens for image formation on CCD. The section of the single lens and a light path at the time of image formation are shown in FIG. 1. The lens shown in FIG. 1 is a rod lens which has a flat face at one end thereof and a shallow concave shape at the opposite side (i.e. the plane of incidence) with a length of 11 mm.

Figure 2:
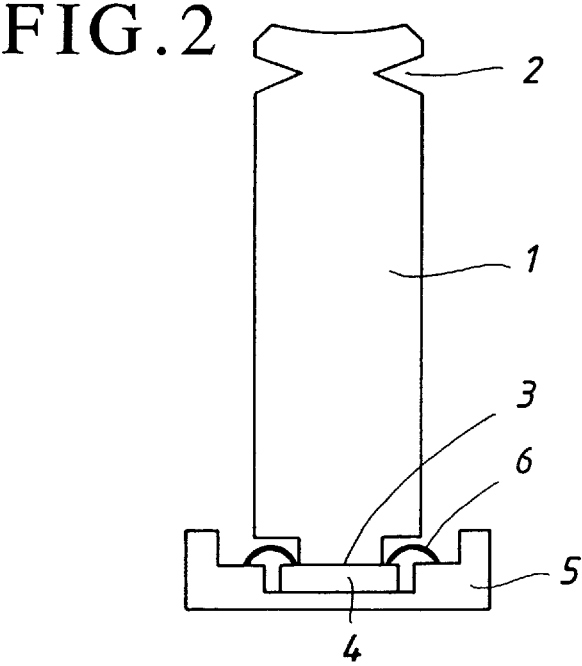
FIG. 2 is a front view of an optical device used in Example 1.
Figure 3:
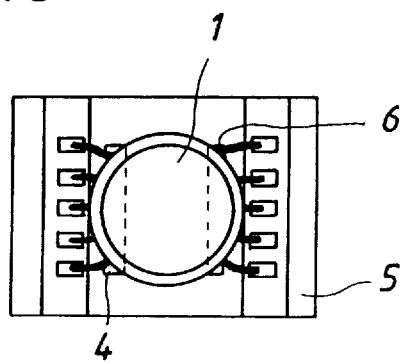
FIG. 3 is a plan view of the optical device of FIG. 2.

FIGS. 2 and 3, respectively, show an optical device made using the lens 1. The optical device includes a CCD (computer-controlled device) 4 attached to a ceramic substrate 5. An image pickup face 3 is attached to a light-receiving face of the CCD 4 so that the optical axes thereof are in alignment, thereby permitting the rod lens 1 to stand vertically as shown in FIG. 2. Indicated by 6 are wires each connecting an electrode of the CCD 4 and a signal processing circuit formed in the ceramic substrate 5 therewith. The rod lens 1 is fixed by utilizing a V-shaped groove of a stop 2 thereof although not particularly shown in FIG. 2. The optical device with such a structure as illustrated above was subjected to an imaging test. As a result, it was found that a color image which could stand practical use was obtained. This demonstrated that a color camera could be constituted of only two components including the CCD 4 and the bluish GRIN lens 1. In this case, the signal processing circuit was integrally assembled, thus ensuring further miniaturization to obtain a very small-size optical element.

EXAMPLE 2

The GRIN lens of Example 1 was polished as having a flat face on one side and a concave shape on the other side. In Example 2, the bluish GRIN lens was polished as being flat on opposite sides thereof. A thin plano-concave lens was separately made using a homogeneous glass and the flat surface of this lens was bonded to one end face of the GRIN lens. This composite lens was subjected to a similar test, revealing that although slightly poor in quality, the resultant image close to that of Example 1 was obtained. In this connection, however, when the two lenses were bonded such that the optical axis of the concave lens determined by its shape and the optical axis of the GRIN lens determined by the medium were not well coincident with each other, the degradation of images such as out-of-focusing became considerable.

EXAMPLE 3

180 ml of silicon tetraethoxide, 80 ml of ethanol and 13 ml of 2N hydrochloric acid were mixed to partially hydrolyze the silicon alkoxide. Then, 60 g of a n-butanol solution of zirconium n-butoxide having a concentration of 85 wt% and 45 ml of a solution of copper (II) methoxide in 2-dimethylaminomethanol were added to the mixture and agitated for 1 hour. Subsequently, a mixed solution of water, ethanol and 1N ammoniacal solution was gently dropped in the solution under agitation to prepare a sol.

The thus prepared sol was poured into a polypropylene tube having an inner diameter of 10 mm and the tube was closed at both ends thereof, followed by allowing it to stand over day and night at room temperature to obtain a wet gel. The wet gel was placed and aged in a constant temperature oven at 60° C. for 5 days. The thus aged wet gel was immersed in 3N sulfuric acid for 1 hour and 15 minutes, thereby permitting the zirconium component to be dissolved out, followed by immersion in a mixed alcohol of methanol and ethanol at a ratio by volume of 1:2 over day and night to wash away the sulfuric acid component from the wet gel. Little change in the colorless transparency of the treating solution was observed, from which it was considered that the copper component was scarcely dissolved out.

The thus washed wet gel was placed in a polymethylpentene tube having an inner diameter of 16.5 mm and a cover therefor. The cover which had a pinhole preliminarily made was put on the tube, followed by placing in a constant temperature oven at 60° C. to dry the gel thereby obtaining a transparent, crack-free, dried gel having a gradient in concentration of the zirconium component.

The dried gel was placed in a tubular furnace and sintered by heating to 1075° C. while keeping it at given temperatures on the way of the heating. As a result, a transparent rod-shaped GRIN lens which had a diameter of about 3 mm and which assumed a darker blue color toward the periphery thereof was obtained. The lens was polished in a convex form and applied to a lens system, by which the blue color of the lens was substantially uniformized therethrough out.

EXAMPLE 4

30 ml of tetramethyl silicate, 7.2 ml of triethyl borate and 2.3 ml of aluminum sec-butoxide were mixed, to which 15 ml of 0.01N hydrochloric acid was added and agitated at room temperature for 1 hour under which partial hydrolysis reaction was effected. A mixture of 80.7 ml of an aqueous solution of 2 moles/liter of potassium acetate and 36.8 ml of a solution of 1.2 mole % of acetic acid was added to the solution. The mixture was violently agitated at room temperature for 3 minutes, followed by allowing it to stand for 3 minutes and pouring it into a teflon container having a cylindrical hole having an inner diameter of 10 mm, followed by gelation at room temperature. The resultant gel was aged at 30° C. for 5 days and immersed in an ethanol solution of lead acetate and potassium acetate, followed by further aging of the gel. The gel was then immersed in a mixed solvent of IPA and water at a mixing ratio of 5:5 and acetone in this order each for 2 days. By virtue of the immersion, fine crystals of the lead acetate and the potassium acetate were precipitated and fixed in the fine pores of the gel.

The thus obtained homogeneous gel was immersed in a methanol solution of 0.2 moles/liter of lead acetate for 1 hour and 45 minutes for distribution. Thereafter, the gel was again immersed in a mixture of IPA and acetone at a ratio of 5:5, acetone and acetone in this order each for 2 days, thereby permitting fine crystals of the lead acetate and the potassium acetate to be fixed. For the immersion, ferrous chloride was preliminarily dissolved in IPA and acetone to saturation, respectively. The resultant gel was dried at 30° C. for 5 days and sintered by heating to 630° C. to obtain a transparent rod-shaped GRIN lens which uniformly assumed from blue to dark green color as a whole.

The GRIN lens was subjected to measurement of spectral transmittance, revealing that although the transmittance in the visible light range lowered on comparison with a GRIN lens containing copper, the absorption in the IR region was great. When an objective of an endoscope for operation was assembled using the GRIN lens, application to instruments using a semiconductor laser as a laser surgical knife became possible.

What is claimed is:

1. A gradient index optical element comprising a component capable of absorbing a near infrared ray, said gradient index optical element exhibiting a high transmittance in a visible light wavelength region and exhibiting a low transmittance in a near infrared wavelength region.

2. A gradient index optical element according to claim 1, wherein said component capable of absorbing a near infrared ray is at least one member selected from the group consisting of CuO, FeO, CoO and $VO_2$ and a matrix therefor consists of a glass.

3. A gradient index optical element according to claim 1, wherein said component capable of absorbing a near infrared ray is at least one member selected from the group consisting of anthraquinones, phthalocyanine compounds, naphthalocyanine compounds, chromium metal complex salts, cobalt complex salts, polycondensates of tungsten hexachloride and tin chloride, diothyl metal complexes, squalilium compounds, oxidizer-doped acetylene polymers, mixtures of thiourea and copper sulfide, imonium materials and $Cu^{2+}$, and a matrix therefor consists of a plastic resin.

4. A gradient index optical element according to claim 1, wherein said component capable of absorbing a near infrared ray has a concentration distribution along a radial direction when said optical element is in the form of a rod.

5. A gradient index optical element according to claim 4, wherein the concentration distribution of said component along a radial direction is in inverse proportional relation with a thickness of said optical element in the form of a lens so that near infrared absorbabilities at different positions along the radial direction of the lens are substantially constant.

6. A gradient index optical element according to any one of claims 1 to 5, wherein said optical element comprises a medium whose dispersion distribution consists of a low dispersion distribution or a negative dispersion distribution.

7. A method for making a gradient index optical element according to a solgel process, which comprises preparing a sol containing a material capable of forming at least one component selected from the group consisting of CuO, FeO, CoO and $VO_2$ in a sintered glass body, and gelling the sol.

8. A method for making a gradient index optical element according to claim 7, wherein said material is a member selected from the group consisting of metal alkoxides, metal chelates and derivatives thereof which have at least one element selected from the group consisting of Cu, Fe, Co and V in the molecule.

9. A method for making a gradient index optical element according to a solgel process, which comprises forming a wet gel, dried gel or calcined gel, and contacting the wet gel, dried gel or calcined gel with a solution or a gas containing a material capable of forming at least one component selected from the group consisting of CuO, FeO, CoO and $VO_2$ in a sintered glass body.

10. A method for making a gradient index optical element according to claim 9, wherein said solution containing a material capable of forming at least one component selected from the group consisting of CuO, FeO, CoO and $VO_2$ is a distribution characteristic-imparting solution.

11. A method for making a gradient index optical element according to any one of claims 7 to 10, wherein said material consists of a member selected from the group consisting of acetate and chloride having at least one element selected from the group consisting of Cu, Fe, Co and V in the molecule.

12. An optical device, comprising:
a gradient index optical element comprising a component capable of absorbing a near infrared ray, said gradient index optical element exhibiting a high transmittance in a visible light wavelength region and exhibiting a low transmittance in a near infrared wavelength region; and
an electronic image sensor.

13. The optical device according to claim 12, wherein the electronic image sensor has a light-receiving face to which one piece of the gradient index optical element is attached, said gradient index optical element being in the form of a rod and provided with a groove for a stop halfway along its lengthwise direction.

* * * * *